(12) United States Patent
Snaman, Jr. et al.

(10) Patent No.: US 7,844,775 B2
(45) Date of Patent: Nov. 30, 2010

(54) DISTRIBUTION OF DATA IN A DISTRIBUTED SHARED STORAGE SYSTEM

(75) Inventors: William E. Snaman, Jr., Nashua, NH (US); Stanley Rabinowitz, Chelmsford, MA (US); David M. Aiduk, West Newbury, MA (US); Mitchel Kuninsky, Woburn, MA (US)

(73) Assignee: Avid Technology, Inc., Burlington, MA (US)

( * ) Notice: Subject to any disclaimer, the term of this patent is extended or adjusted under 35 U.S.C. 154(b) by 343 days.

(21) Appl. No.: 11/524,666

(22) Filed: Sep. 21, 2006

(65) Prior Publication Data
US 2007/0073990 A1 Mar. 29, 2007

Related U.S. Application Data

(60) Provisional application No. 60/720,152, filed on Sep. 23, 2005, provisional application No. 60/748,839, filed on Dec. 9, 2005, provisional application No. 60/748,840, filed on Dec. 9, 2005, provisional application No. 60/748,838, filed on Dec. 9, 2005.

(51) Int. Cl.
*G06F 13/00* (2006.01)
*G06F 13/28* (2006.01)
*G06F 7/00* (2006.01)

(52) U.S. Cl. ............... 711/112; 711/165; 711/E12.002

(58) Field of Classification Search ............... 711/112, 711/165, E12.002; 707/1
See application file for complete search history.

(56) References Cited

U.S. PATENT DOCUMENTS

| | | | | | |
|---|---|---|---|---|---|
| 5,754,844 | A | * | 5/1998 | Fuller | 707/6 |
| 6,065,010 | A | * | 5/2000 | Otsuka et al. | 707/101 |
| 7,512,673 | B2 | * | 3/2009 | Miloushev et al. | 709/221 |
| 2002/0199060 | A1 | * | 12/2002 | Peters et al. | 711/114 |
| 2004/0003173 | A1 | * | 1/2004 | Yao et al. | 711/114 |
| 2006/0080353 | A1 | * | 4/2006 | Miloushev et al. | 707/102 |
| 2008/0010296 | A1 | * | 1/2008 | Bayliss et al. | 707/10 |

OTHER PUBLICATIONS

Goel, Ashish, et al., "SCADDAR: An Efficient Randomized Technique To Reorganize Continuous Media Blocks", In Proceedings of the 18th International Conference on Data Engineering, 2002.

* cited by examiner

*Primary Examiner*—Sheng-Jen Tsai
*Assistant Examiner*—Edward J Dudek
(74) *Attorney, Agent, or Firm*—Oliver Strimpel

(57) ABSTRACT

Segments or blocks of a file can be distributed among an number n of storage units by using a function of sequentially assigned segment identifiers for each segment, where the function is reduced modulo n, so long as the function is not congruent to segment identifier, modulo n, for any given segment identifier. An example of such a function, where n is the number of storage units and k is a segment identifier, is $f(k)=ak+b$, where a is relatively prime to n. Such a function can be computed quickly for any given segment. As the list of storage units changes, data may be redistributed using a new mapping of segments to storage units. Any new mapping can be restricted so that segments only move to a new storage unit or from an old storage unit, and not from one existing storage unit to another. In this way, the amount of data to be moved is limited. A chain of the lists of available storage units, as that list changes over time, is maintained to permit the history of file mappings to be recreated.

14 Claims, 3 Drawing Sheets

1: w   5: w           1: w   5: w

2: z   6: z           2: z   6: z

3: y   7: y    →      3: a   7: y

4: x   8: x           4: x   8: a

DISTRIBUTION OF DATA IN A DISTRIBUTED SHARED STORAGE SYSTEM

CROSS-REFERENCE TO RELATED APPLICATIONS

This application claims the benefit of priority to U.S. provisional patent application Ser. Nos. 60/720,152 entitled "Highly-Available Blade-Based Distributed Computing System" filed 23 Sep. 2005, 60/748,839 having the same title, 60/748,840 entitled "Distribution of Data in a Distributed Shared Storage System", and 60/748,838 entitled "Transmit Request Management in a Distributed Shared Storage System", the latter three having been filed 09 Dec. 2005. This application is related to non-provisional patent application Ser. No. 11/524,678 entitled "Highly-Available Blade-Based Distributed Computing System" and Ser. No. 11/524,999 entitled "Transmit Request Management in a Distributed Shared Storage System", both filed 21 Sep. 2006. The contents of all of the aforementioned applications are incorporated herein by reference.

BACKGROUND

Distributed computing architectures enable large computational and data storage and retrieval operations to be performed by a number of different computers, thus reducing the time required to perform these operations. Distributed computing architectures are used for applications where the operations to be performed are complex, or where a large number of users are performing a large number of transactions using shared resources. A distributed shared storage system is a kind of distributed computing architecture If a distributed shared storage system is used to provide high bandwidth real-time media data, such as video data, that is shared by a large number of users, several complexities arise. In such an application, the high bandwidth real-time media data is distributed among multiple storage devices or servers. Multiple client applications or machines may access the data. In such an application, data may be divided into blocks and distributed among the storage devices.

There are many ways to distribute data among multiple storage devices. For example, the data may be distributed randomly, pseudorandomly, are simply sequentially. However, it has been shown that performance can be reduced if two or more files are distributed with the same pattern, or if two adjacent blocks from a single file are stored on the same server. Thus, a random, pseudorandom or other irregular pattern that is, or has a high likelihood of being, unique for each file is generally desirable.

While it is simple to produce a random or pseudorandom sequence or other irregular pattern using an appropriate algorithm, most such algorithms apply an algorithm iteratively, starting with a seed value, to generate each value in the sequence. Thus, the computation of the nth value in the sequence requires n computations. Thus, access to the nth block of data in a file would require n computations to determine its storage location. Such computations may be avoided if the sequence is stored. However, such sequences are generally long sequences, and such a sequence would have to be stored for each file in the shared storage system.

An additional problem to be addressed in a large, shared storage system is what should be done in the event that storage devices fail, are added or are removed from the system. The technique for distributing data among the various storage elements also should be resilient to changes in the system.

SUMMARY

Segments or blocks of a file can be distributed among an number n of storage units by using a function of sequentially assigned segment identifiers for each segment, where the function is reduced modulo n, so long as the function is not congruent to segment identifier, modulo n, for any given segment identifier. An example of such a function, where n is the number of storage units and k is a segment identifier, is $f(k)=ak+b$, where a is relatively prime to n. Such a function can be computed quickly for any given segment. As the list of storage units changes, data may be redistributed using a new mapping of segments to storage units. Any new mapping can be restricted so that segments only move to a new storage unit or from an old storage unit, and not from one existing storage unit to another. In this way, the amount of data to be moved is limited. A chain of the lists of available storage units, as that list changes over time, is maintained to permit the history of mappings to be recreated.

DETAILED DESCRIPTION

Figure 1:
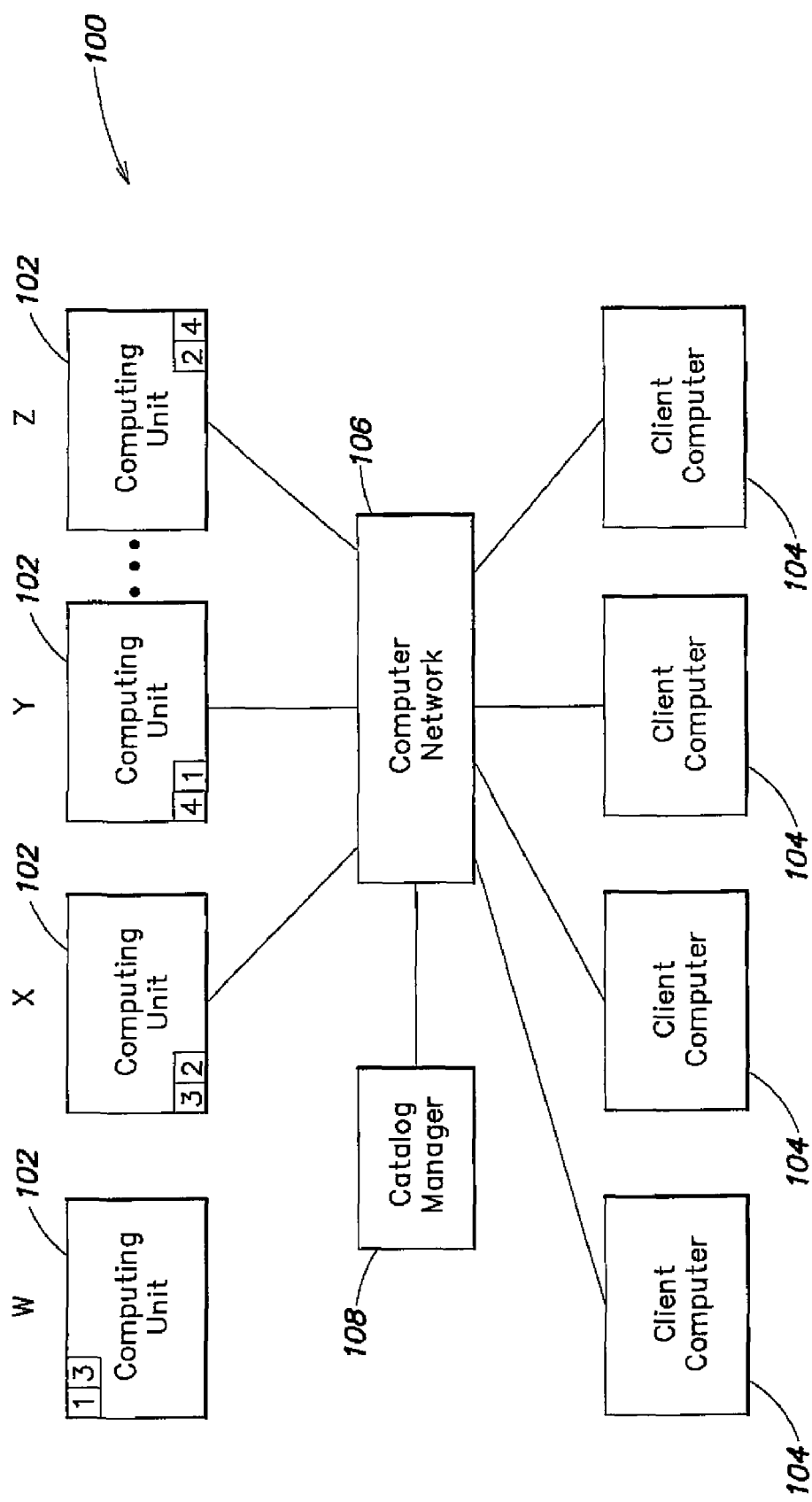
FIG. 1 is a block diagram of an example distributed computing system.

FIG. 1 illustrates an example distributed computer system 100. The computer system 100 includes a plurality of computing units 102. There may be an arbitrary number of computing units 102 in the computer system 100. The computing units 100 are interconnected through a computer network 106 which also interconnects them with a plurality of client computers 104.

Each computing unit 102 is a device with a nonvolatile computer-readable medium, such as a disk, on which data may be stored. The computing unit also has faster, typically volatile, memory into which data is read from the nonvolatile computer-readable medium. Each computing unit also has its own processing unit that is independent of the processing units of the other computing units, which may execute its own operating system, such as an embedded operating system, e.g., Windows XP Embedded, Linux and VxWorks operating systems, and application programs. For example, the computing unit may be implemented as a server computer that responds to requests for access, including but not limited to read and write access, to data stored on its nonvolatile computer-readable medium as raw data blocks or in one or more data files in the file system of its operating system. A computing unit may perform other operations in addition to data storage and retrieval, such as a variety of data processing operations.

Client computers 104 also are computer systems that communicate with the computing units 102 over the computer network 106. Each client computer may be implemented using a general purpose computer that has its own nonvolatile storage and temporary storage, and its own processor for executing an operating system and application programs. Each client computer 104 may be executing a different set of application programs and/or operating systems.

An example application of the system shown in FIG. 1 for use as a distributed, shared file system for high bandwidth media data will now be described. Such an application is described in more detail in U.S. Pat. No. 6,785,768. The computing units 102 may act as servers that deliver data to or receive data from the client computers 104 over the computer network 106. Client computers 104 may include systems which capture data received from a digital or analog source for storing the data on the storage units 102. Client computers 104 also may include systems which read data from the storage units, such as systems for authoring, processing or playback of multimedia programs, including, but not limited to, audio and video editing. Other client computers 104 may perform a variety of fault recovery tasks. For a distributed file system, one or more client computers may be used to implement one or more catalog managers 108. A catalog manager is a database, accessible by the client computers 104, that maintains information about the data available on the computing units 102. This embodiment may be used to implement a broadcast news system such as shown in PCT Publication WO97/39411, dated 23 Oct. 1997.

Such a distributed, shared file system may be implemented using a blade-based storage system such as described in U.S. Provisional Patent Application 60/720,152, entitled "Highly-Available Blade-Based Distributed Computing System", filed on 23 Sep. 2005, and U.S. Non-Provisional patent application Ser. No. 11/524,678 having the same title filed on 21 Sep. 2006, each of which is hereby incorporated by reference.

The latency between a request to transfer data, and the actual transmission of that request by the network interface of one of the units in such a system can be reduced using techniques described in U.S. Provisional Patent Application entitled "Transmit Request Management in a Distributed Shared Storage System", by Mitch Kuninsky, filed on 09 Dec. 2005, and U.S. Non-Provisional patent application Ser. No. 11/524,999 having the same title filed on 21 Sep. 2006, each of which is hereby incorporated by reference.

In one embodiment of such a distributed, shared file system the data of each file is divided into segments. Redundancy information for each segment is determined, such as a copy of the segment. Each segment and its redundancy information are stored on the storage of different computing units. The computing units on which a segment and its redundancy information are stored are selected using an irregular pattern. This pattern may be random, pseudorandom, quasi-random or a form of deterministic sequence, such as a permutation. In general, the pattern should be such that it provides a non-sequential distribution that is different from one file to the next and from the file to its redundancy information. The redundancy information should be laid out such that for any given computing unit in the server set the redundant file information shall spread evenly among all the other computing units in the server set. This aids in the performance of the redistribution of data when a computing unit is removed or added to the server set.

An example distribution of copies of segments of data is shown in FIG. 1. In FIG. 1, four computing units 102, labeled w, x, y and z, store data which is divided into four segments labeled 1, 2, 3 and 4. An example distribution of the segments and their copies is shown, where: segments 1 and 3 are stored on computing unit w; segments 3 and 2 are stored on computing unit x; segments 4 and 1 are stored on computing unit y; and segments 2 and 4 are stored on computing unit z. More details about the implementation of such a distributed file system are described in U.S. Pat. No. 6,785,768, which is hereby incorporated by reference. In this system, the file system allows applications to access files by file name, but associated a file with a unique file identifier or file ID. The file is divided into segments as noted above. Each segment also has an identifier or segment ID. A segment of a file is stored on and read from a server by the client providing to the server the file ID and the segment ID. The server stores the segment at some location in its storage device and maintains its own mappings of file IDs and segment IDs to these locations.

An example technique for distributing data among the storage elements will now be described. This technique uses a list of the available storage elements. This list may be maintained by and stored in the catalog manager or other part of the system that can be responsible for monitoring the status of each storage element in the system. The list can in turn be provided to each client and server in the system.

As noted above, each file that will be stored in the system has its own unique identifier in the system called its file identifier or file ID. Each file ID is associated with a seed value. This number can be generated pseudorandomly for the file at the time the file is created. The seed is used to generate an offset s and a stride k. These values are used to select a storage element in the list of the available storage elements for each block i in the file. For example, if there are n storage elements in the list, then the offset s is a whole number that is greater than or equal to 1 and less than or equal to n ($1<=s<=n$, s is a whole number). A value called a stride (k) is selected so that it is relatively prime to n. The storage element e associated with any block i in a file is determined by computing the value $e=s+ik \mod n$. Any other formula f(i) may be used to compute the element e so long as f(i) is not congruent to i modulo n for any i.

As an example of this distribution technique, assume that there are 8 segments of a data file: 1, 2, 3, 4, 5, 6, 7 and 8 to be stored on servers w, x, y and z. With 4 servers, an offset of 2 and a stride of 3, the following mappings of segments to servers will be made: 1:w, 2:z, 3:y, 4:x, 5:w, 6:z, 7:y, 8:x. The redundancy information is mapped by pseudo randomizing the block (i) by the seed and adding this to the current storage element index (e) modulo (n). Collisions at (e) are rectified by adding the stride (k) to the element index (e) modulo (n), which guarantees uniqueness. The random pattern generated sprays the redundant information among all server units in the server group from any one particular storage node. This allows for balanced distributed performance of redistribution rebuilds during storage element removal and addition operations. Alternatively, the redundancy information could be mapped to the servers by continuing, after the last segment, with the next server in the list according to the stride.

A file map is a data structure that defines the list of servers and a level of redundancy, which may be a number of copies of each segment that is stored. Each file may have its own unique file map. Also, a set of files may be grouped together (such a group is herein called workspace), and may have the same file map. A workspace allows different redundancy levels to be applied to different groups of files. All segments in workspace are assigned the same identifier, herein called a basis identifier. However, each file in a workspace still has its own seed, and thus its own unique offset and stride to be used to select a server from the server list. By associating the same basis identifier with all segments from files in the same workspace, all of these segments can be quickly identified on a storage unit.

Using such a distribution technique, only the seed is stored for each file. Also, the computation to be performed, given the nth segment of any file, is constant order is not order n. When a segment is stored on a storage unit, it is associated with its basis identifier, file ID and segment ID. The seed for the file from which the segment originates also may be stored for each segment by the storage unit.

A challenge with any such system, however, is how to handle the addition and removal of servers during normal operation. In particular, a server may fail, or may become temporarily unavailable, or may be removed. A server also may be added. Thus, the list of currently available servers may be different from the list of servers used to originally distribute the data, which impacts the complexity involved in the client for locating a segment of a data file. Further, the benefits of this kind of data distribution, namely, load balancing, uniform storage usage and resiliency to failure, are reduced when a server is removed or added. Ideally, some redistribution of data among the servers should occur when a server is removed or added.

To assist in handling changes in the available servers, the catalog manager or other application responsible for monitoring server status maintains a history of the list of servers. For example, a server list may be an ordered list of available servers and may have an associated unique identifier, called a server list identifier. A server list may have an associated flag indicating whether it is a complete list or whether it is a partial list that merely indicates modifications to a previous server list. A history, called a server list chain, may be stored in the form of an ordered list of server lists. Each server list in the server list chain represents a modification to a previous server list in the chain. A file map for a workspace may refer to the server list chain.

Figure 2:
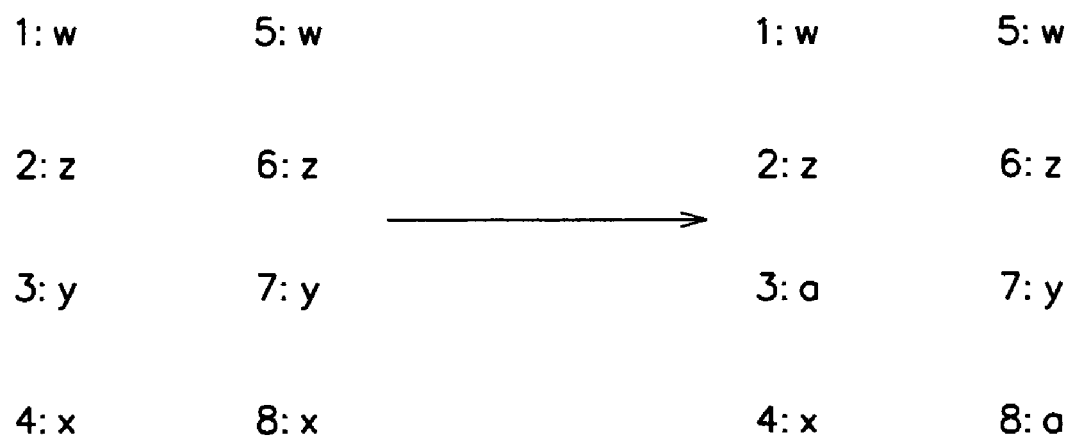
FIG. 2 is an illustration of an example data mapping after a server is added to the system.
Figure 3:
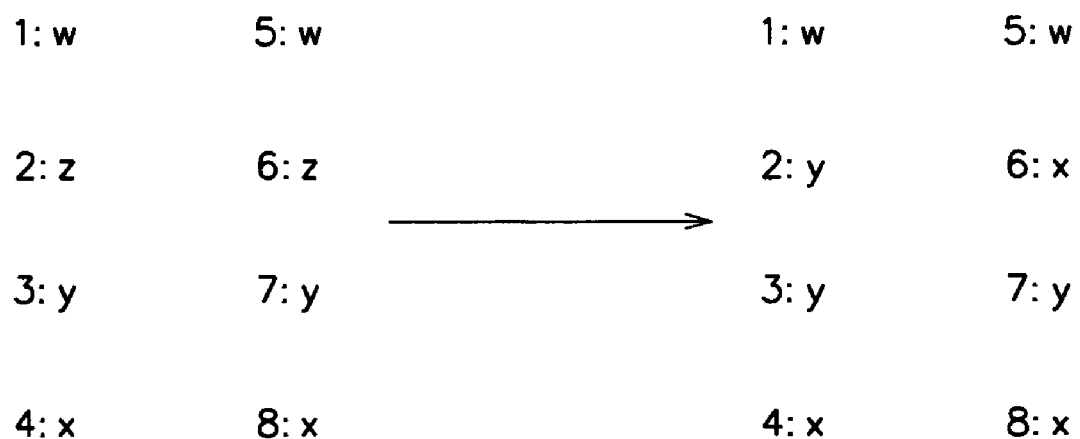
FIG. 3 is an illustration of an example data mapping after a server is deleted from the system.

An example of the redistribution that may occur after a server is removed or added will now be described in connection with FIGS. 2 and 3. Referring to FIG. 2 and using the example mapping from above of segments 1 through 8 of a file onto a set of servers w, x, y and z, assume that a server a is added to the list of servers. There would now be five servers in the file map. Assume the seed for the file provides an offset of 1 and a stride of 7 for the distribution function. A new mapping of segments to servers could be 1:w, 2:y, 3:a, 4:x, 5:z, 6:w, 7:y, 8:a. If redistribution were done to achieve this new mapping, blocks 2, 5 and 6 would move to a server that was among the original set of servers, which may not be efficient. Only blocks 3 and 8 are moved to the new server a. Accordingly, to reduce the amount of data that is moved, only those blocks that are moved to the added server are moved. The original locations of the other blocks are retained. The new mapping, as shown in FIG. 2 is thus 1:w, 2:z, 3:a, 4:x, 5:w, 6:z, 7:y and 8:a. Thus, the storage units storing segments-3 and 8 would identify and move these segments.

Referring to FIG. 3 and again using the example mapping from above of segments 1 through 8 of a file onto a set of servers w, x, y an z, assume that server z is removed from the list of servers. There would be three servers in the file map. Assume the seed for this file produces an offset of 1 and a stride of 2 for the distribution function. A new mapping of segments to storage units could be 1:w, 2:y, 3:x, 4:w, 5:y, 6:x, 7:w and 8:y. If redistribution were done to achieve this new mapping, all of the blocks except block 1 would be moved, which may not be efficient. Instead, only blocks 2 and 6 which were on server z are moved to new locations defined by the new distribution function. The original locations of the other blocks are retained. Thus, the servers that currently store blocks 2 and 6 would move these blocks to storage units y and x respectively. If server z was unavailable to provide the data for blocks 2 and 6, the server that stores the redundancy information for these blocks would send a copy of the block to the new location.

When a new server list is created for a workspace or for a file, or the redundancy level is changed, for example by the catalog manager, this information is sent to all of the servers. Each server operates independently to determine what data it has that should be redistributed to other servers. In particular, each server determines which segments are to be sent to the other servers and initiates a process for this redistribution. In particular, it identifies all segments that have the same basis ID for this workspace. From among these segments, it determines for each segment, given the new file map, its segment ID and the offset and stride produced by the seed corresponding to its file ID, whether, and to what storage unit if any, the segment should be moved. The server then queues up transfer requests to transfer for each identified segment. When a segment is confirmed to have been received by the other server, the server deletes or updates the meta-data for the segment of its storage. When all segments have been distributed, the catalog manager or other application that initiates redistribution can be notified that the server successfully completed its redistribution.

A user interface may be provided to graphically illustrate the status of each server during the redistribution operation. Such an interface is particularly useful if it indicates whether a server is in the process of redistributing and making an additional copy of data for which that server has the copy. The user interface could identify this storage element as being "at risk," i.e., indicating that a failure of that element could result in data loss.

When a client is reading data from files stored on this distributed storage system, its file system determines the file ID for the file and the segment ID containing the desired data. The current server list chain and the distribution function are used to identify a server from which the client requests the desired segment. The client then requests the desired segment from the identified server. It is possible, however, the identified server does not have the desired segment because the segment may have been moved (and a new server list may be available), or the segment has not yet been moved to conform to the most current server list, or because the server has become unavailable. If a server indicates that it does not have the requested segment, the client has many options. It may request a new server list from the catalog manager, and, if one is available, determine a new server from which to request the desired segment. The client may determine a server from which to request the desired segment according to a mapping generated using a prior server list. The client also may request the redundancy information for the desired segment using the current server list.

The foregoing system is particularly useful in implementing a highly available, distributed, shared file system for supporting high bandwidth temporal media data, such as video and audio data, that is captured, edited and played back in an environment with a large number of users.

It also is possible for a client or the catalog manager or other application to delete a file, or a copy of the data for a file. Such delete operations also involve using the mapping of data for the file to the storage units. To support delete operations, each storage subsystem maintains an in-memory allocation table for itself in which one of the states of a block is "to-be-deleted". This state is maintained until the on-disk allocation tables are updated in the background by the storage subsystem. When a client deletes a file, it first notifies a catalog, which is updated to indicate that the file is deleted. The client then notifies each storage unit to delete the segments of the file it has. The storage units then update their in-memory allocation tables. When these transactions are completed, the client's file system indicates to the application that the delete operation has completed. The storage units then, in the background, can update their on-disk allocation tables. If there is a subsequent failure of a storage unit after the operation has completed or the unit could not be communicated to during the operation, the storage unit should be able to rectify these file blocks. It does so at system startup or periodically in the background by asking the catalog for the state of the blocks it has. It passes the file block's file ID to the catalog as one in series of file IDs. It need only ask once per file ID during the operation. The catalog informs the storage unit of the state of the file, exists or not, and the current end of file (EOF). All blocks with the same file ID will be updated in-memory accordingly during the rectification process up to and through the current EOF. The normal background update of the on-disk allocation table then finishes the process.

In such a system, high resolution material can be segregated from low resolution material, which in turn will segregate network traffic from different clients into different parts of the network. In such an application, data may be divided into segments and distributed among storage elements according to a non-uniform pattern within the set of storage elements designated for each type of content.

Having now described an example embodiment, it should be apparent to those skilled in the art that the foregoing is merely illustrative and not limiting, having been presented by way of example only. Numerous modifications and other embodiments are within the scope of one of original skill in the art and are contemplated as falling within the scope of the invention.

What is claimed is:

1. A distributed shared storage system, comprising:
   a plurality of client systems;
   a plurality of independent storage units for storing a plurality of files, each file comprising a plurality of segments of data, each of the plurality of segments being identified by a file identifier corresponding to the file from which that segment originates and a segment identifier;
   wherein a client requests a segment of data by providing the segment identifier corresponding to the requested segment and the file identifier corresponding to the requested segment;
   wherein for each of the plurality of files, segments of the file are distributed among the plurality of storage units by using a mapping based on a linear function of the segment identifier for each segment, wherein the function is reduced modulo n, wherein n is the number of independent storage units in the distributed shared storage system, and wherein,
   a segment identified by segment identifier i of the file is mapped onto storage element e in accordance with a formula $e=(s+ik) \bmod n$, wherein s is an offset, and k is a stride, wherein the offset and the stride are generated from a seed value associated with the file, and k is relatively prime to n, 2. The distributed shared storage system of claim 1, wherein the formula is used to provide an index into a list of the n storage units.

3. The distributed shared storage system of claim 1, wherein addition of a new storage unit to the plurality of storage units or removal of one of the plurality of storage units causes data to be redistributed using a new mapping of segments to storage units.

4. The distributed shared storage system of claim 3, wherein, if a new storage unit is added, the new mapping causes at least one of the plurality of segments to move to the new storage unit from one of the plurality of storage units, without causing segments to move from one of the plurality of storage units to another one of the plurality of storage units.

5. The distributed shared storage system of claim 2, wherein a chain of lists of available storage units is maintained as storage units are added or removed.

6. The distributed storage system of claim 3, wherein if one of the plurality of storage units is removed, the new mapping causes the segments stored on the removed storage unit to be mapped onto the remaining ones of the plurality of storage units without mapping segments from one of the remaining ones of the plurality of storage units to another one of the remaining ones of the plurality of storage units.

7. A method of storing a data file on a plurality of computer-readable storage units, the data file comprising a plurality of segments, each segment being identified by a segment identifier, the method comprising:
   for each of the plurality of segments, mapping that segment to one of the plurality of storage units wherein the mapping is based on a linear function of the corresponding segment identifier, wherein the function is reduced modulo n,
   wherein n is the number of storage units in the plurality of computer-readable storage units;
   generating a seed value;
   generating an offset value s and a stride value k, wherein s and k are derived from the seed value, wherein the offset value is a whole number greater than or equal to 1 and less than or equal to n, and wherein k is a whole number that is relatively prime to n;
   wherein the mapping is $e=(s+ik) \bmod n$, wherein e identifies the storage unit to which a segment having segment identifier i is mapped; and
   storing the segment on the storage unit to which it is mapped.

8. The method of claim 7, further comprising storing a plurality of data files on the plurality of computer-readable storage units, the plurality of data files including the first-mentioned data file, wherein storing each of the plurality of data files involves mapping the segments of that data file to the plurality of storage units based on a corresponding linear function associated with that data file.

9. The method of claim 8, further comprising for each of the plurality of data files, generating a corresponding seed value to be associated with that data file and using the seed value to generate an offset value s and a stride value k corresponding to that data file, wherein the offset value is a whole number greater than or equal to 1 and less than or equal to n, and wherein k is a whole number that is relatively prime to n, wherein the mapping for that file is $e=(s+ik) \bmod n$, wherein e identifies the storage unit to which a segment having segment identifier i is mapped.

10. The method of claim 9, further comprising generating an index into a list of the plurality of storage units using the file mappings.

11. The method of claim 7, wherein if a new storage unit is added to the plurality of storage units or one of the plurality of storage units is removed, redistributing the segments among the plurality of storage units using a new mapping.

12. The method of claim 11, wherein, if a new storage unit is added, the new mapping maps at least one of the plurality of segments to the new storage unit without mapping segments from one of the plurality of storage units to another one of the plurality of storage units.

13. The method of claim 11, wherein if one of the plurality of storage units is removed, the new mapping maps the segments stored on the removed storage unit onto the remaining ones of the plurality of storage units without mapping segments from one of the remaining ones of the plurality of storage units to another one of the remaining ones of the plurality of storage units.

14. The method of claim 11, further comprising maintaining a chain of lists of available storage units as storage units are added or removed.

* * * * *